G. MACLOSKIE.
ELECTROPNEUMATIC AIR BRAKE SYSTEM.
APPLICATION FILED FEB. 1, 1910.
957,227.
Patented May 10, 1910.
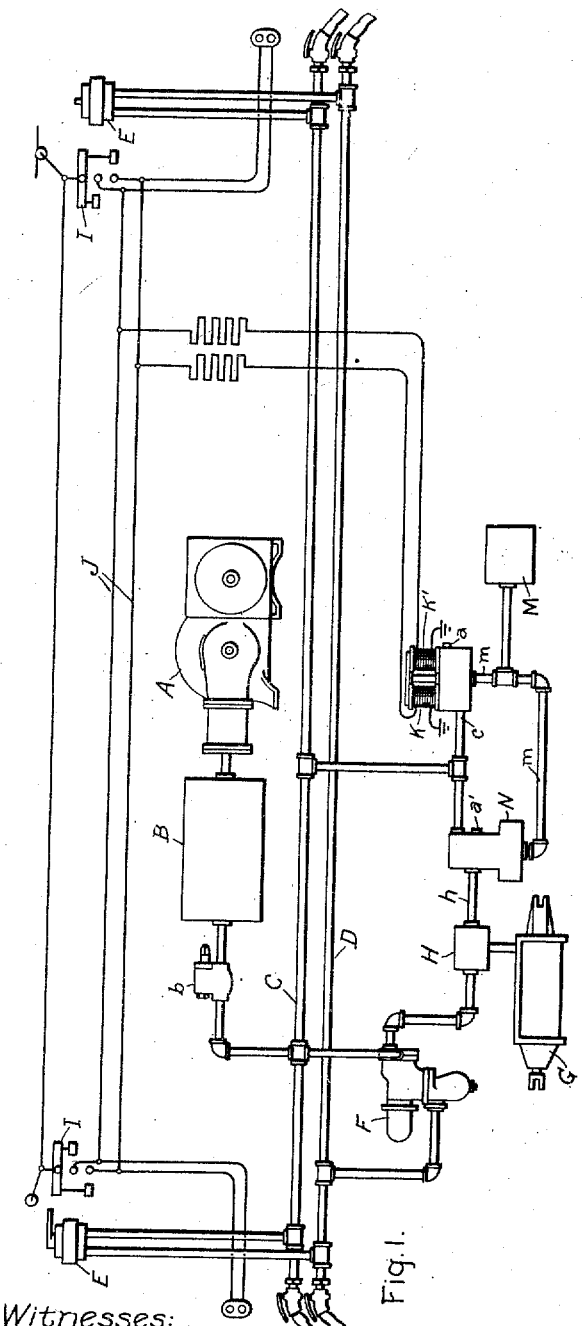
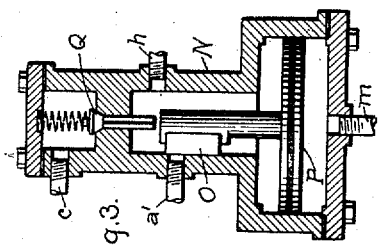
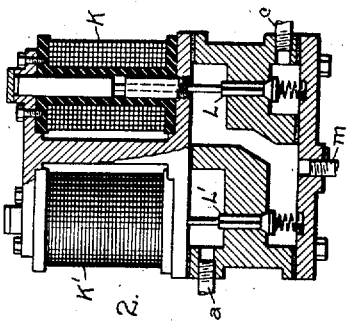
Witnesses:
Inventor
George Macloskie,
by
His Attorney.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

ELECTROPNEUMATIC AIR-BRAKE SYSTEM.

957,227.  Specification of Letters Patent.  Patented May 10, 1910.

Application filed February 1, 1910. Serial No. 541,362.

*To all whom it may concern:*

Be it known that I, GEORGE MACLOSKIE, a citizen of the United States, residing at Schenectady, county of Schenectady, State of New York, have invented certain new and useful Improvements in Electropneumatic Air-Brake Systems, of which the following is a specification.

My invention relates to air brake systems in which the application and release of the brakes are electrically controlled, and its object is to provide a novel arrangement of the valves and controlling means therefor such that the brake cylinder pressures on all the cars of a train will be substantially equal at all times regardless of differences in the travels of the brake cylinder pistons, and small leakages from brake cylinders will be automatically provided for.

My invention consists in providing a valve mechanism for controlling the admission of air to, and exhaust from, the brake cylinder, controlled jointly by brake cylinder pressure and by a second pressure the amount of which is varied by the electromagnetic control apparatus.

My invention will best be understood by reference to the accompanying drawing in which, Figure 1 shows diagrammatically an air brake system arranged in accordance with my invention; Fig. 2 shows a view, partly in cross-section, of the electro-pneumatically operated valves; and Fig. 3 shows a cross-sectional view of the valve controlled thereby for admitting air to, and releasing it from, the brake cylinder.

I have shown my invention applied to a combined pneumatic and electric brake system, the pneumatic system comprising the usual train pipe, triple valves and motorman's valve, and the electric system comprising suitable electromagnetically operated valve mechanism, the two systems being connected alternately to brake cylinder as one or the other is used by a double throw check valve. A system of this type is shown in my prior Patent, No. 869,444, dated October 29, 1907.

In the drawing, A represents the air compressor and B the main reservoir charged thereby and connected through a suitable reducing or feed valve $b$ to a train pipe C to which the motorman's valves are connected on one side. These valves, on the other side, are connected to the train pipe D to which the triple valves are connected.

E E are the motorman's valves; F the triple valve, and G the brake cylinder.

H represents the double throw check valve by which the pneumatic or electric valve mechanism, according as one or the other is used, is connected to the brake cylinder in the same manner as in my prior patent above referred to.

The electric system, in which my present invention resides, includes switch contacts I I under the control of the motorman, a pair of train wires J, either of which may be energized by the switch contacts I, and a pair of magnets K and K' controlling the electric application and release of the brakes, respectively. When the switch contacts I I are in the position shown, neither train wire J and, consequently, neither magnet K or K', is energized. By moving the switch contact one direction or the other, one magnet or the other is energized.

With the particular arrangement of valves shown in Fig. 2 when neither magnet is energized the valves are in the lap position. When magnet K is energized air is admitted to the brake cylinder and when magnet K' is energized air is exhausted from the brake cylinder. The valve mechanism by which these results are obtained is shown in Figs. 2 and 3. In Fig. 2, L and L' represent puppet valves which are normally held seated by light springs and which are opened, respectively, when the magnets K and K' are energized so as to pull down their plungers. The valve casing has three pipe connections; one $c$ leading to the train pipe C; another $a$ opening to atmosphere, and third $m$ which is connected to what may be termed a "regulating" reservoir M. This pipe $m$ extends also into a valve casing N in which is a slide valve O controlled by a piston P and a puppet valve Q which is normally held seated by a light spring but which is adapted to be engaged and unseated by the rod of piston P. This valve casing has four pipe connections; one $m$ on one side of piston P; another $h$ connected through the double throw check valve H to brake cylinder G; a third, $c$ connected to the control pipe, and a fourth, $a'$ opening to atmosphere. During the electric operation of the brakes, pipe $h$ is connected to brake cylinder, so that piston P is subjected to the opposing pressures of brake cylinder and of the regulating reservoir M.

When the magnets K and K' are both de-energized and puppet valves L and L' both closed, piston P and slide valve O are in the position shown in Fig. 3. In this position, both the slide valve O and puppet valve Q are closed, so that the valve mechanism is in lap position. To admit air to the brake cylinder by means of the electric control, switch I is moved so as to energize the lower control wire J, thereby energizing magnet K. This magnet pulls down its plunger, opening puppet valve L and connecting the control pipe through pipe connections $c$ and $m$ to the regulating reservoir M. The pressure in this reservoir, consequently, rises by an amount determined by the length of time that magnet K is kept energized. The increased pressure in the regulating reservoir is impressed on one side of piston P through pipe $m$ so that the piston rod is moved back so as to open puppet valve Q. Air is then admitted from control pipe C, through pipe connections $c$, valve Q and pipe connection $h$ to the brake cylinder G. Air continues to flow into the brake cylinder until the pressure in the brake cylinder equals that in the regulating reservoir N; when pressures on opposite sides of piston P are balanced and the piston moves back allowing valve Q to be seated by its spring. For a partial release of the brakes, magnet K' is energized long enough to release a portion of the air from the regulating reservoir M through valve L'. The reduction of air in reservoir M and, consequently, on the lower side of piston P, causes this piston to move so as to open the port leading to atmosphere at $a'$. Air, consequently, flows from brake cylinder through pipe connections $h$ and $a'$ to atmosphere and the exhaust continues until the pressure in the brake cylinder falls to an amount equal to or slightly below that in the regulating reservoir, when the piston P moves back, causing slide valve O to close the exhaust. For a complete release of the brakes, magnet K' is kept energized until the air is entirely exhausted from reservoir M, in which case slide valve O remains open and all the air is exhausted from the brake cylinder.

If all the regulating reservoirs M on all the cars of the train are of the same size and the magnet valves on all the cars are of the same construction, the pressures on all the regulating reservoirs will always be the same on all the cars, since all the magnet valves are simultaneously actuated; therefore, the brake cylinder pressures on all the cars will be equal, since these pressures always correspond to the pressure in the regulating reservoirs. Furthermore, if while the brake valves are in lap position with the brakes applied, pressure should leak from a brake cylinder, the piston P will operate to open valve Q and supply sufficient air to the brake cylinder to compensate for the leak and to maintain the pressure.

I do not desire to limit myself to the particular construction and arrangement of parts shown and described, but aim in the appended claims to cover all modifications which are within the scope of my invention.

What I claim as new and desire to secure by Letters Patent of the United States, is,—

1. In an air-brake system, in combination with the brake cylinder and a source of pressure therefor, a regulating reservoir, valve mechanism for admitting air from said source to, and exhausting air from, said regulating reservoir, electromagnetic means for operating said valve mechanism, valve mechanism for admitting air from said source to, and exhausting air from, the brake cylinder, and operating means therefor controlled jointly by the pressures in the brake cylinder and in said regulating reservoir.

2. In an air brake system, in combination with the brake cylinder and a source of pressure therefor, valve mechanism for admitting air from said source to, and exhausting air from, the brake cylinder, operating means therefor controlled jointly by brake cylinder pressure and a second pressure, and electromagnetic means for varying the amount of said second pressure.

3. In an air brake system, in combination with the brake cylinder and a source of pressure therefor, valve mechanism for admitting air from said source to, and exhausting air from, the brake cylinder, operating means therefor comprising a movable member subjected on one side to brake cylinder pressure, and electromagnetic means for producing a variable pressure on the opposite side of said member.

4. In an air brake system, in combination with the brake cylinder and a source of pressure therefor, a regulating reservoir, two valves for respectively admitting air from said source to, and exhausting air from, said regulating reservoir, a pair of electromagnets and control circuits therefor for operating said valves, valve mechanism for admitting air from said source to, and exhausting air from, said brake cylinder, and operating means therefor comprising a movable member subjected to the opposing pressures in the brake cylinder and in said regulating reservoir.

5. In an air brake system, in combination with the brake cylinder and a source of pressure therefor, a regulating reservoir, valve mechanism for admitting air from said source to, and exhausting air from, said regulating reservoir, electromagnetic means for operating said valve mechanism, valve mechanism for admitting air from said source to, and exhausting air from, the brake cylinder, and operating means therefor comprising a movable member subjected to the opposing pressures in the brake cylinder and in said regulating reservoir.

In witness whereof, I have hereunto set my hand this 31st day of January, 1910.

GEORGE MACLOSKIE.

Witnesses:
    BENJAMIN B. HULL,
    HELEN ORFORD.